(12) United States Patent
Suzuki

(10) Patent No.: US 6,850,270 B1
(45) Date of Patent: Feb. 1, 2005

(54) ELECTRONIC CAMERA WITH BUILT-IN PRINTER

(75) Inventor: Takeshi Suzuki, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/500,341

(22) Filed: Feb. 8, 2000

(30) Foreign Application Priority Data

Feb. 8, 1999 (JP) ............................................ 11-029820

(51) Int. Cl.[7] .......................... H04N 5/225; H04N 9/04
(52) U.S. Cl. ............... 348/207.2; 348/372; 348/207.99
(58) Field of Search ......................... 348/207.99, 207.2, 348/372, 373, 374, 375, 376; 396/429, 30

(56) References Cited

U.S. PATENT DOCUMENTS

| | | | | |
|---|---|---|---|---|
| 5,166,721 A | * | 11/1992 | Akasaka ..................... 396/104 |
| 5,835,809 A | * | 11/1998 | Stephenson et al. ........ 396/429 |
| 5,847,836 A | * | 12/1998 | Suzuki ........................ 358/296 |
| 5,946,031 A | * | 8/1999 | Douglas ................ 348/207.99 |
| 5,978,609 A | * | 11/1999 | Aoki ........................... 396/429 |
| 6,031,999 A | * | 2/2000 | Ogawa ........................ 396/303 |
| 6,040,849 A | * | 3/2000 | McIntyre et al. ............ 347/214 |
| 6,104,886 A | * | 8/2000 | Suzuki et al. ............... 396/429 |
| 6,233,016 B1 | * | 5/2001 | Anderson et al. ........... 348/372 |
| 6,351,287 B1 | * | 2/2002 | Sakaegi et al. .............. 348/372 |
| 6,559,963 B1 | * | 5/2003 | Kamimura .................. 358/1.15 |
| 6,577,338 B1 | * | 6/2003 | Tanaka et al. ........... 348/207.2 |
| 6,580,460 B1 | * | 6/2003 | Takahashi et al. .......... 348/372 |

FOREIGN PATENT DOCUMENTS

JP        9-26561        1/1997

* cited by examiner

Primary Examiner—Ngoc-Yen Vu
Assistant Examiner—Justin Misleh
(74) Attorney, Agent, or Firm—Straub & Pokotylo; John C. Pokotylo

(57) ABSTRACT

An electronic camera includes an electronic imaging section which performs a photoelectron conversion of a subject image to generate an electric image information, a print section to print an image obtained from the image information by the electronic imaging section on a printing paper, a record section to record the image information by the electronic imaging section on a record medium, a mode select section to select one camera mode from among a plurality of camera modes, a power supply remainder detection section to detect a remainder to be able to supply the power supply, and a power supply remainder judgment section to set a level necessary for executing an operation corresponding to a camera mode selected by the mode select section according to each of the plurality of modes and to judge whether a detected remainder is equal to or larger than a setting level.

8 Claims, 4 Drawing Sheets

ELECTRONIC CAMERA WITH BUILT-IN PRINTER

CROSS-REFERENCE TO RELATED APPLICATION

This application is based upon and claims the benefit of priority from the prior Japanese Patent Application No. 11-029820, filed Feb. 8, 1999; the entire contents of which are incorporated herein by reference.

BACKGROUND OF THE INVENTION

The present invention relates to an electronic camera to obtain electric image data by imaging a subject image, and especially, to an electronic camera which comprises a print mechanism.

Recently, an electronic camera (digital still camera) to image the subject image by the CCD imaging element etc., and to memorize the obtained image data to record mediums such as compact flash (CF) and Smart Media (SSFDC) has been put to practical use. It is expected that this electronic camera will spread more and more in the future because of the small size, lightness, and in addition, the rewritable of image data.

By the way, in the typical optical camera, a camera which prints taking picture image at the same time as taking picture (instant photograph by diffusion transfer method, and Polaroid method, etc.), so-called instant camera, has been put to practical use. In an electronic camera, a camera which enables the printout immediately after taking a picture is variously proposed by providing the print mechanism to the camera in itself.

However, an electronic camera which comprises a print mechanism has the following disadvantages. A comparatively large current is required and it also takes time for the print operation. On the other hand, in general, since a small battery is used for the power supply, the power supply capacity is small. Therefore, the power supply remainder becomes insufficient in the print processing, an irregular print is occurred, and the print processing ends on the way occasionally. Here, when the print processing is interrupted when the print mechanism is accompanied by the chemical treatment such as the diffusion transfer method, the one piece becomes useless.

In an electronic equipment, the technique which urges the exchange of the battery has been adopted by checking the battery remainder (reduced-voltage check) and putting out warning when the remainder of the battery becomes below a predetermined constant value. However, in an electronic camera, the load is different in each of operations such as taking a picture, the record, the reproduction, and the print. Optimal power supply management cannot be performed by uniformly performing the reduced-voltage check for these operations.

For example, when the check level is determined according to the record, the case where the print which requires a large current more than the record cannot be performed is occurred. Oppositely, when the check level is determined according to the print, the user will exchange the battery by the reduced-voltage check even if there is a sufficient battery remainder for taking a picture and the record, though it is insufficient to the print.

BRIEF SUMMARY OF THE INVENTION

An object of the present invention is to provide an electronic camera which can use a built-in battery to its maximum without uselessness, and can prevent failing of the print, with the configuration which comprises the print mechanism to print out the taking a picture image.

To solve the above-mentioned subject matter, the present invention adopts the following configurations.

An electronic camera of present invention is characterized by comprising: an electronic imaging section which performs a photoelectron conversion of a subject image to generate an electric image information; a print section to print an image obtained from the image information by the electronic imaging section on a printing paper; a record section to record the image information by the electronic imaging section on a record medium; a mode select section to select one camera mode from among a plurality of camera modes; a power supply remainder detection section to detect a remainder to be able to supply the power supply; and a power supply remainder judgment section to set a level necessary for executing an operation corresponding to a camera mode selected by the mode select section according to each of the plurality of modes and to judge whether a detected remainder is equal to or larger than a setting level.

Another electronic camera of present invention, which is driven by a battery, is characterized by comprising: an imaging section which converts a subject image into image data; a record section which records the image data on a detachable record medium; a print section which prints the image data in a predetermined print form; a battery remainder evaluation section which compares a remainder of the battery loaded into the electronic camera with a predetermined judgment level; and a sequence controller which controls a camera sequence based on the comparison result, wherein the sequence controller applies a different judgment level to the battery remainder evaluation section at start of an operation of the print section and in a print operation. In this case, the sequence controller includes a direct print mode which transfers directly to the print section without transferring the image data to the record section.

According to an electronic camera of the present invention, since the level corresponding to the camera mode is set, and it is judged whether the detected power supply remainder is more than the setting level, optimal power supply management corresponding to the mode can be performed.

Here, preferable manners of the present invention are as follows.

(1) The power supply remainder judgment section sets a setting level at a print mode lower than a level at a record mode to record an image which is taken by the electronic imaging section in the record medium.

(2) The power supply remainder judgment sectrion set a setting level of the print start at the print mode higher than a setting level of modes (for example, record mode which records the image taken by the electronic imaging section on the record medium) other than the print mode.

(3) The power supply remainder judgment section sets a setting level at starting a print at a print mode is set higher than a setting level at a record mode to record an image which is taken by the electronic imaging section in the record medium, and sets a setting level at the print mode is set lower than a setting level at the record mode to record the image which is taken by the electronic imaging section in the record medium.

In the above-mentioned each electronic camera, by setting the reduced-voltage check level high before starting the print, the inconvenience such as becoming of the power supply remainder insufficient during printing can be avoided, and the print processing can surely be performed to the last minute. The print can be prevented from being interrupted by setting the reduced-voltage check level low during printing even if the power supply remainder decreases during printing. These are especially valid for the print method like the diffusion transfer method such that the print fails and a photosensitive form becomes useless when the print processing is interrupted.

(4) The power supply remainder judgment section sets a level corresponding to a mode at starting a taking a picture to a level until the print operation of the image is normally completed, at a direct print mode which performs only a print operation without recording an image taken by the electronic imaging section on the record medium. In the direct print mode, at the start of the taking a picture, the print completion can be guaranteed as long as taking a picture is permitted by setting the level corresponding to the mode at the level until the print of the image is normally completed.

(5) In the above-mentioned each of electronic cameras, the print section has a luminescence section to expose a photosensitive form based on the image information obtained by the electronic imaging section and a transportation section to transport a photosensitive form.

Even if the battery remainder is insufficient to the print processing, it is usual to be able to use for other processings. In the present invention, by switching the setting level according to the camera mode, it can be judged that the battery with a little remainder can be used in case of which mode, as a result, the battery can be used without uselessness to the last minute. For example, even if a remainder becomes a capacity which cannot be used to the print, when it is possible to use sufficiently to imaging and the record, by prohibiting printing, but permitting only imaging and the record, etc., it becomes possible to use the battery to the last minute.

According to the present invention, in the configuration which comprises the print mechanism to print out the image after taking a picture, since the reduced-voltage check level is changed according to various operation modes to check the power supply, optimal power supply management can be performed anytime. Especially, by raising the reduced-voltage check level before starting the print and setting the reduced-voltage check level low during printing, the print can surely be prevented from being interrupted according to the power supply remainder.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
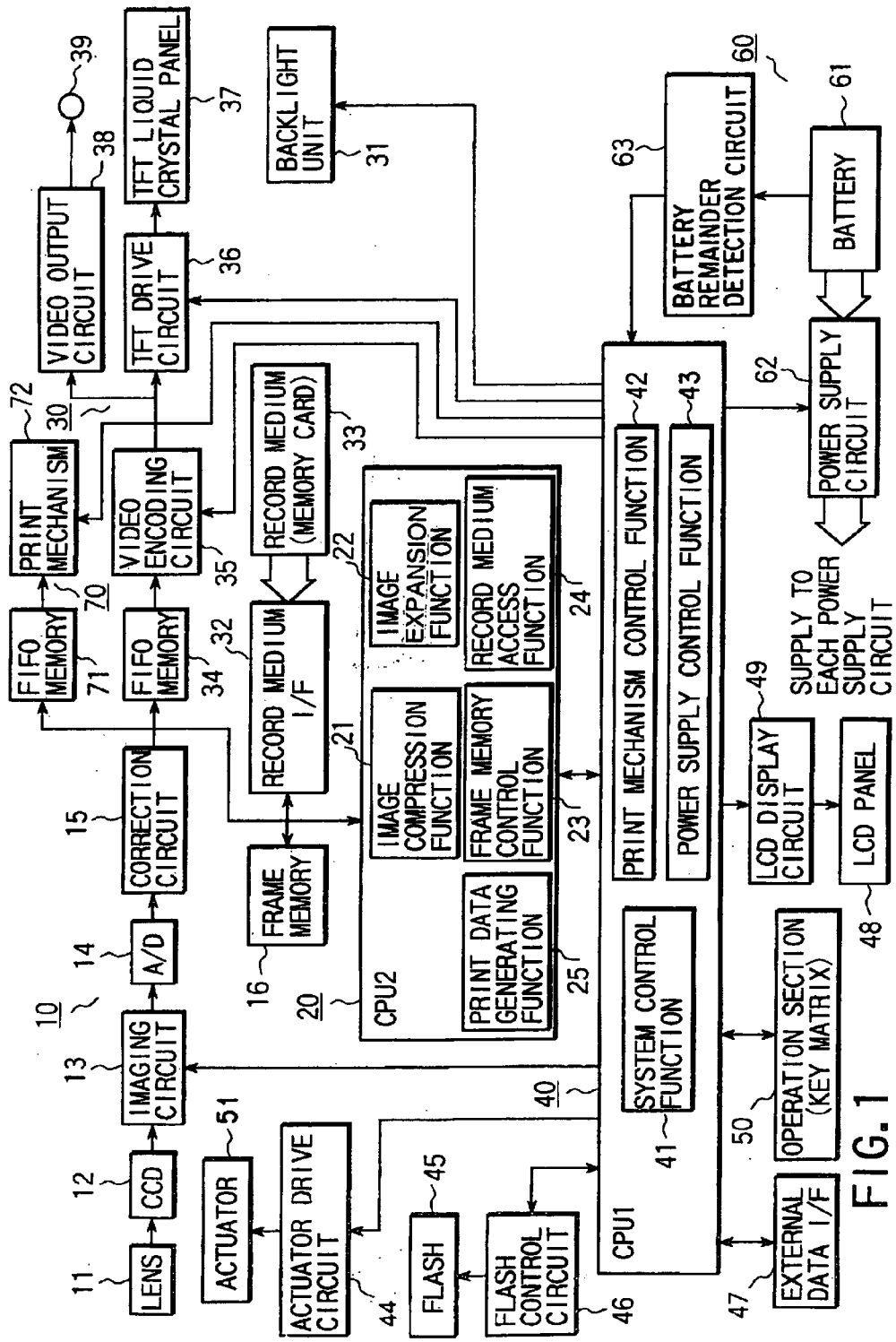
FIG. 1 is block diagram which shows basic configuration of electronic camera which comprises print mechanism.

Hereafter, details of the present invention will be explained with the embodiment referring to the drawings.

(First Embodiment)

FIG. 1 is a block diagram which shows configuration of electronic camera having print function according to the first embodiment of the present invention.

An electronic camera according to the first embodiment has imaging section 10, image data processing section 20, image data record and display section 30, control section 40, operation section 50, power supply section 60, and print section 70, in roughly classified.

Imaging section 10 has imaging lens 11, CCD imaging element 12, imaging circuit 13, A/D converter 14, correction circuit 15 which performs white balance, and the gamma correction, etc., and frame memory 16, etc. Imaging section 10 images the subject image taken through the optical system, which includes imaging lens 11, on CCD imaging element 12, and converts the imaged image data into a digital signal with A/D converter 14. Imaging section 10 performs the white balance and the gamma correction, etc. with correction circuit 15, and thereafter stores images in frame memory 16 one by one.

Image data processing section 20 has CPU 2 which comprises image compression function section 21, image expansion function section 22, frame memory control function section 23, record medium access function section 24, and print data generation function section 25. Image data processing section 20 has the following functions. Image data processing section 20 stores the plurality of image data stored in said frame memory 16 to the record buffer not shown in the figure by compressing the image one by one, expands the image data stored in this record buffer, and sends to FIFO memory 34 of image data record and display section 30. In addition, image data processing section 20 accesses record medium 33 of image data record and display section 30.

Image data record and display section 30 has backlight 31, record medium I/F 32, record medium 33 such as the flash memory card, display FIFO memory 34, video encode circuit 35, TFT driver circuit 36, TFT liquid crystal panel 37, video output circuit 38, and video output terminal 39. Image data record and display section 30 has the following functions. Image data record and display section 30 reads the image data recorded in the record buffer and records in record medium 33. Image data record and display section 30 reads the image data recorded in record medium 33, sends to the display system, and displays the image.

The image data sent to the display system is temporarily stored in display FIFO memory 34. The image data read from display FIFO memory 34 is converted into a video signal with video encode circuit 35 and the character etc. are added thereto. Then, on one hand, a video signal to which this character etc. are added is supplied to TFT liquid crystal panel 37 through TFT driver circuit 36, and displayed as a subject image. On the other hand, it is output from a video output terminal 39 to the outside as an image signal through video output circuit 38.

Control section 40 is mainly constructed by CPU 1 which comprises system control function section 41, print mechanism control function section 42, and various other function sections (for example, compression rate change function section and pixel number change function section, etc.). Control section 40 totally controls the entire systems of imaging section 10, image data processing section 20, and image data record and display section 30, etc.

Actuator driver circuit 44 to drive actuator 51 which includes zooming motor or AF motor, etc., flash control circuit 46 to control luminescence of flash 45, external data I/F 47 to exchange data with personal computer etc., and LCD display circuit 49 to display various information on LCD panel 48 are attached to control section 40.

Operation section 50 is connected with above-mentioned control section 40, and has the keyboard matrix which performs the switch input for the camera operation as a main operation section. Operation section 50 performs necessary control operation by giving the operation signal from the outside to above-mentioned control section 40.

Power supply section 60 uses battery 61 (for example, 1.5 V×4 pieces) as main power supply and supplies a power supply of a predetermined voltage to each circuit through power supply circuit 62. A battery remainder detection circuit 63 to detect the remainder of this battery 61 in real time is provided in power supply section 60.

Figure 2:
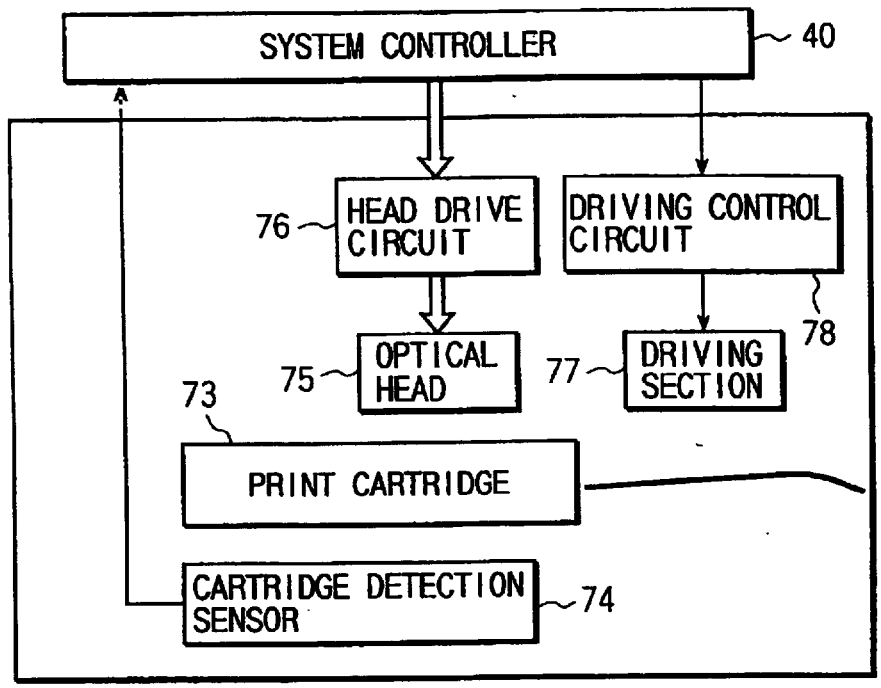
FIG. 2 is block diagram which shows specific configuration of print mechanism.

Print section 70 is constructed by FIFO memory 71 to memorize the print data temporarily and the print mechanism 72. Print mechanism 72 comprises print cartridge 73 which stored the form, cartridge detection sensor 74, line optical head 75, head driver circuit 76 to emit and drive optical head 75 electrically, driving section 77 which moves the form, and driver control circuit 78 to control driving section 77, as shown in FIG. 2.

Figure 3:
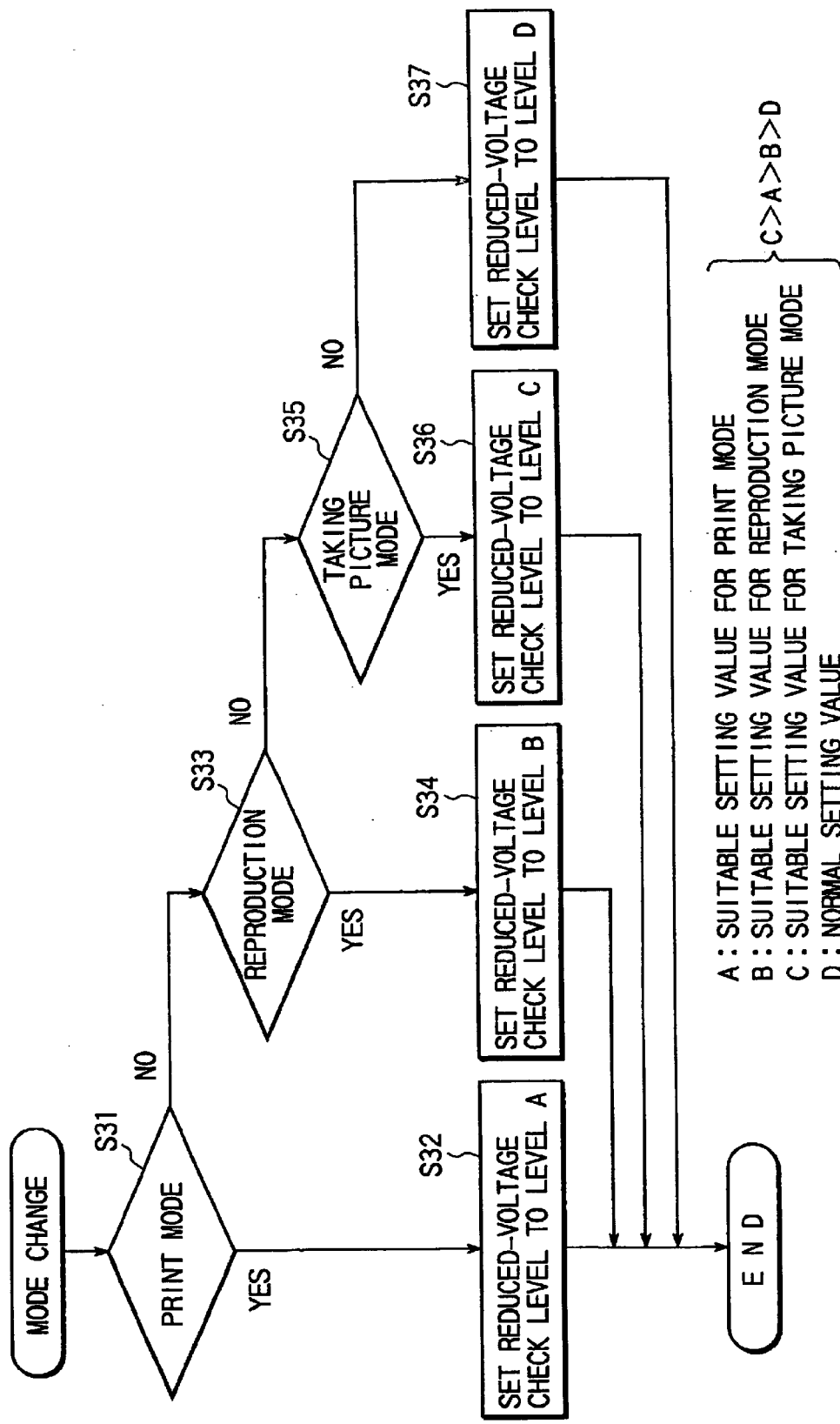
FIG. 3 is a flow chart which shows processing procedure in the first embodiment at print mode.

Next, the operation of this embodiment will be explained referring to the flow chart of FIG. 3.

When the camera mode is changed by the user, first, whether it is a print mode or not is judged (step S31), and if it is a print mode, the reduced-voltage check level is set at level A which is suitable for the print mode (step S32). If it is not a print mode, whether it is a reproduction mode or not is checked (step S33). If it is a reproduction mode, the reduced-voltage check level is set at level B which is suitable for the reproduction mode (step S34). If it is not a reproduction mode, whether it is a taking a picture mode or not is checked (step S35).

If it is a taking a picture mode, the reduced-voltage check level is set at level C which is suitable for the taking a picture mode (step S36). If it is not a taking a picture mode, the reduced-voltage check level is set at level D which is suitable for a normal mode (record, state display, etc.) (step S37).

Here, the relation of level A to level D each of which is the reduced-voltage check level has a relation of, for example, C>A>B>D. Since the reduced-voltage check level is optimally set depending on the mode which is selected by the user, optimal power supply management can be performed anytime. The number of camera modes and the setting levels corresponding thereto can be properly changed according to the specification. The reduced-voltage check is not limited to the voltage, but may be a multiplication the amount of the current.

As described above, optimal power supply management can be performed in this embodiment anytime by changing the reduced-voltage check level according to the camera mode. Therefore, since taking a picture and the print are prohibited, and the record and the reproduction, etc. are permitted, when it is an sufficient battery remainder for the record and the reproduction, even if the battery has a remainder which can not use for, for example, the print processing, the battery can be used to the last minute.

(Second Embodiment)

Since a basic configuration of an electronic camera in this embodiment is similar to FIG. 1, therefore drawings will be omitted.

Figure 4:
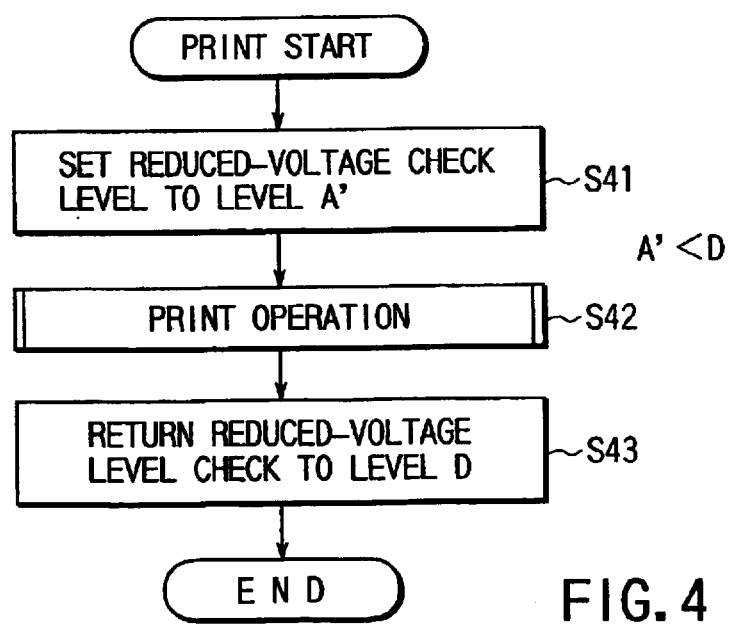
FIG. 4 is a flow chart which shows processing procedure in the second embodiment at print mode.

In this embodiment, when the print start is directed by the user as shown in the flow chart of FIG. 4, first, the reduced-voltage check level is set in level A' (step S41). Here, level A' is assumed to be lower level than usual setting value D (level A'<level D). Usual setting value D is a setting level which is suitable for, for example, the record mode. Subsequently, the print operation is performed (step S42). Then, when the print operation ends, the reduced-voltage check level is returned to level D (step S43).

For the instant camera method in which the print mechanism uses the diffusion transfer method, if the print processing stops on the way, one piece becomes quite useless. Therefore, an interruption of the print should be avoided, first. Then, in this embodiment, by setting level A' which is the reduced-voltage check level in the print mode low, completion of the print is set to be top priority. Therefore, even if the battery remainder a little, the print can be prevented from interrupting.

As described above, in this embodiment, the print can be prevented from interrupting by setting the reduced-voltage check level in the print mode in a low value. Therefore, this embodiment is especially valid when the print mechanism which uses the diffusion transfer method is used.

(Third Embodiment)

Since a basic configuration of an electronic camera in this embodiment is similar to FIG. 1, therefore drawings will be omitted.

Figure 5:
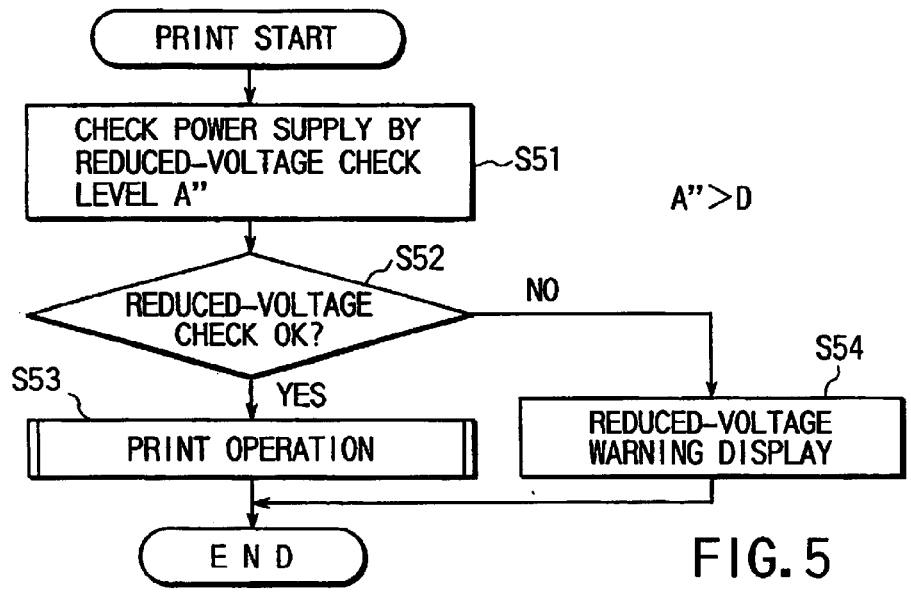
FIG. 5 is a flow chart which shows processing procedure in the third embodiment at taking a picture mode.

In this embodiment, as shown in the flow chart of FIG. 5, when the print start is directed by the user, the power supply remainder is checked first by reduced-voltage check level A" (step S51). Then, it is judged whether the reduced-voltage check is OK (step S52). Here, level A" which is the reduced-voltage check level is higher level than level D which is a usual level. When it is judged that the battery remainder is equal to or larger than check level A", the print operation is performed (step S53). The reduced-voltage check level is set at level A' and the reduced-voltage is checked, as well as the second embodiment, while this printing, when the print ends, the reduced-voltage check level may be returned.

The reduced-voltage warning is displayed without performing the print operation (step S54), when the battery remainder is equal to or less than judged check level A" at step S52.

As described above, in this embodiment, by checking the reduced-voltage by higher level A" than a usual level before start printing, the print will be permitted only when there is a sufficient power supply, and the print can surely be prevented from being interrupted. By lowering the reduced-voltage check level to level A', after the print is started, as well as the second embodiment, the print is completed in top priority, and the print can more certainly be prevented from interrupting.

(Fourth Embodiment)

Since a basic configuration of an electronic camera in this embodiment is similar to FIG. 1, therefore drawings will be omitted.

Figure 6:
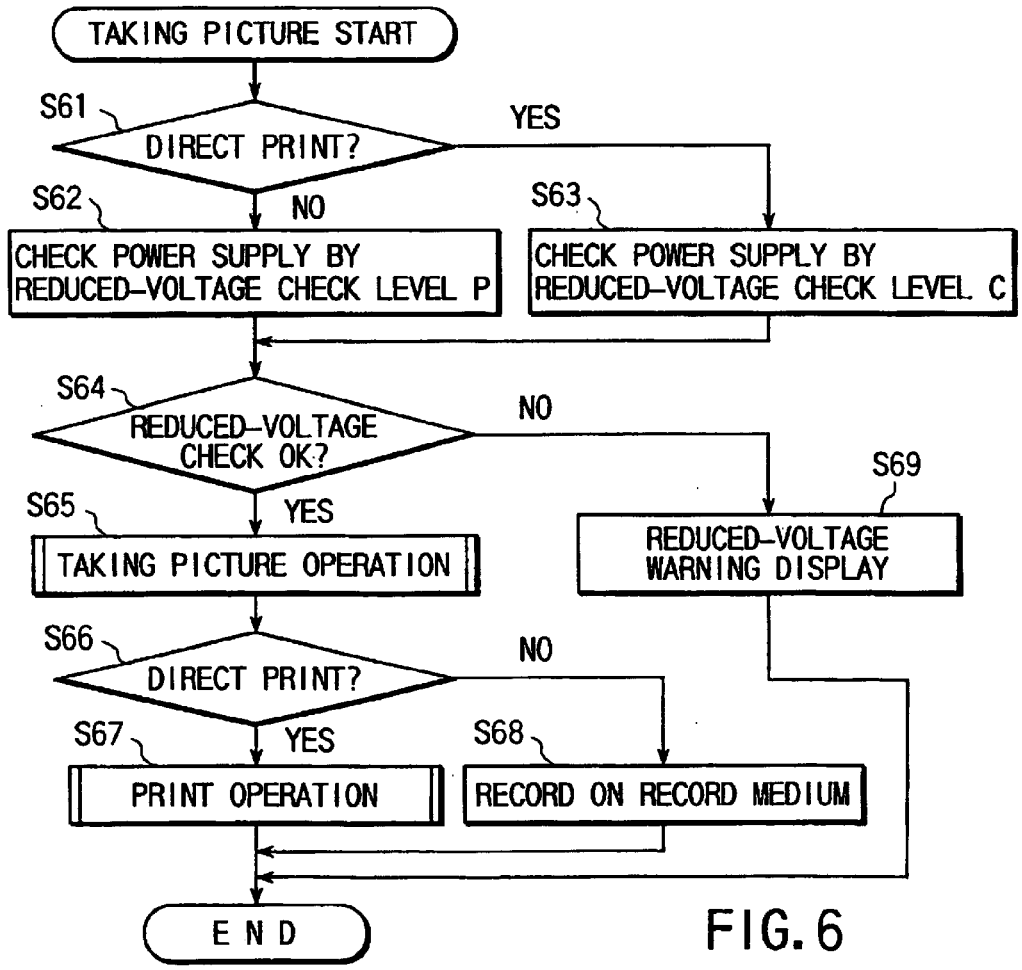
FIG. 6 is a flow chart which shows processing procedure in the fourth embodiment at print mode.

This embodiment is an embodiment which performs the direct print which performs print operation at the same time as taking a picture, as shown in the flow chart of FIG. 6.

First, when the print start is directed by the user, it is judged whether it is a direct print (step S61). When it is judged that it is a direct print, the power supply is checked in the reduced-voltage check level P considered from taking a picture to the print operation (step S62), and when it is judged that it is not a direct print, the battery remainder is checked at level C (C<P) which is a suitable reduced-voltage check level for the taking a picture mode or level D which is a usual reduced-voltage check level (step S63).

Next, it is judged whether the reduced-voltage check is OK (step S64). When it is judged that the reduced-voltage check is OK, the taking a picture operation is performed (step S65). Then, it is judged whether it is a direct print again (step S66). When it is a direct print, the print operation is performed (step S67), and when it is not a direct print, the record on the record medium is performed (step S68).

One side, when it is judged that the reduced-voltage check is not OK in step S64, the reduced-voltage warning is displayed without performing the taking a picture operation (S69).

As described above, in this embodiment, when the user directs a direct print, it is possible to print directly when there is the sufficient battery remainder by checking the reduced-voltage at high level P, which is necessary for direct print. However, when the battery remainder is insufficient, the reduced-voltage warning is displayed, and a direct print is prohibited. Therefore, the inconvenience such that direct print performs even though the battery remainder is insufficient, the print is interrupted during printing after taking a picture, and the form becomes useless, can be prevented beforehand.

The present invention is not limited to each embodiment mentioned above. The configuration of the print mechanism is not limited to a so-called instant camera method to obtain the positive image directly by using the diffusion transfer method, and the printer of the thermal transfer type, the ink-jet type, and the sublimation type may be used.

The configuration of the main body of the camera is not limited to a camera as shown in FIG. 1, and may be a camera which images subject image by the imaging element such as CCD to generate an electric image information, and memorize this image information to the flash memory, etc. In the method of batch display and print out the image to printing paper at the same time as taking a picture, it is also possible to omit the memory such as the flash memory.

The present invention can be carried out by transforming within the range of scope of the invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic camera comprising:
    an electronic imaging section which performs a photo-electron conversion of a subject image to generate an electric image information;
    a print section to print an image obtained from the image information by said electronic imaging section on a printing paper;
    a record section to record the image information by said electronic imaging section on a record medium;
    a mode select section to select one camera mode from among a plurality of camera modes;
    a power supply remainder detection section to detect a remainder to be able to supply the power supply; and
    a power supply remainder judgment section to set a level necessary for executing an operation corresponding to a camera mode selected by said mode select section according to each of said plurality of modes and to judge whether a detected remainder is equal to or larger than a setting level, wherein said power supply remainder judgment section sets a setting level at a print mode lower than a level at a record mode to record an image which is taken by said electronic imaging section in said record medium.

2. The electronic camera according to claim 1, wherein said print section has a luminescence section to expose a photosensitive form based on the image information obtained by said electronic imaging section and a transportation section to transport a photosensitive form.

3. An electronic camera comprising:
    an electronic imaging section which performs a photo-electron conversion of a subject image to generate an electric image information;
    a print section to print an image obtained from the image information by said electronic imaging section on a printing paper;
    a record section to record the image information by said electronic imaging section on a record medium;
    a mode select section to select one camera mode from among a plurality of camera modes;
    a power supply remainder detection section to detect a remainder to be able to supply the power supply; and
    a power supply remainder judgment section to set a level necessary for executing an operation corresponding to a camera mode selected by said mode select section according to each of said plurality of modes and to judge whether a detected remainder is equal to or larger than a setting level, wherein said power supply remainder judgment section sets a setting level at starting a print at a print mode is set higher than a setting level at a record mode to record an image which is taken by said electronic imaging section in said record medium, and sets a setting level at the print mode is set lower than a setting level at the record mode to record the image which is taken by said electronic imaging section in said record medium.

4. The electronic camera according to claim 3, wherein said print section has a luminescence section to expose a photosensitive form based on the image information obtained by said electronic imaging section and a transportation section to transport a photosensitive form.

5. An electronic camera comprising:
    an electronic imaging section which performs a photo-electron conversion of a subject image to generate an electric image information;
    a print section to print an image obtained from the image information by said electronic imaging section on a printing paper;
    a record section to record the image information by said electronic imaging section on a record medium;
    a mode select section to select one camera mode from among a plurality of camera modes;
    a power supply remainder detection section to detect a remainder to be able to supply the power supply; and
    a power supply remainder judgment section to set a level necessary for executing an operation corresponding to a camera mode selected by said mode select section according to each of said plurality of modes and to judge whether a detected remainder is equal to or larger than a setting level, wherein said power supply remainder judgment section sets a level corresponding to a mode at starting a taking a picture to a level until the print operation of the image is normally completed, at a direct print mode which performs only a print operation without recording an image taken by said electronic imaging section on said record medium.

6. The electronic camera according to claim 5, wherein said print section has a luminescence section to expose a photosensitive form based on the image information obtained by said electronic imaging section and a transportation section to transport a photosensitive form.

7. An electronic camera which is driven by a battery, comprising:

an imaging section which converts a subject image into image data;

a record section which records said image data on a detachable record medium;

a print section which prints said image data in a predetermined print form;

a battery remainder evaluation section which compares a remainder of the battery loaded into said electronic camera with a predetermined judgment level; and a sequence controller which controls a camera sequence based on said comparison result, wherein said sequence controller applies a different judgment level to said battery remainder evaluation section at start of an operation of said print section and in a print operation.

8. The electronic camera according to claim 7, wherein said sequence controller includes a direct print mode which transfers directly to said print section without transferring said image data to said record section.

* * * * *